(No Model.) 6 Sheets—Sheet 1.

J. R. WILLIAMS.
TOBACCO STRIPPING AND BOOKING MACHINE.

No. 418,663. Patented Dec. 31, 1889.

WITNESSES:
Gustave Dieterich.
William Goebel.

INVENTOR
John R. Williams
BY
Chas. C. Gill
-ATTORNEY

N. PETERS, Photo-Lithographer, Washington, D. C.

(No Model.) 6 Sheets—Sheet 2.

J. R. WILLIAMS.
TOBACCO STRIPPING AND BOOKING MACHINE.

No. 418,663. Patented Dec. 31, 1889.

WITNESSES:
Gustave Dieterich
William Goebel.

INVENTOR
John R. Williams.

BY
Chas. C. Gill
ATTORNEY (No Model.) 6 Sheets—Sheet 3.

J. R. WILLIAMS.
TOBACCO STRIPPING AND BOOKING MACHINE.

No. 418,663. Patented Dec. 31, 1889.

WITNESSES: Gustave Dieterich. William Goebel.

INVENTOR John R. Williams, BY Chas. C. Gill ATTORNEY

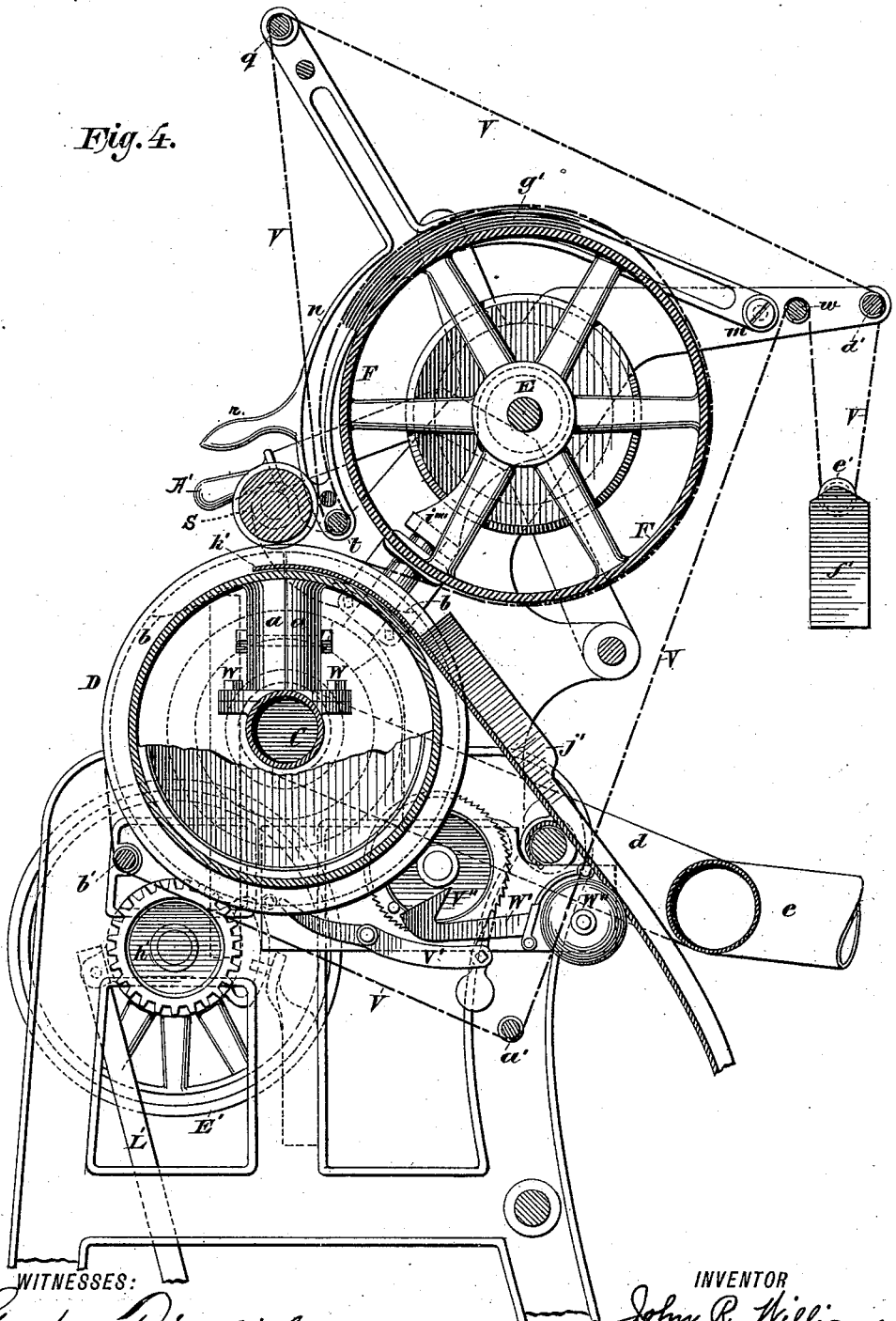

(No Model.) 6 Sheets—Sheet 5.
J. R. WILLIAMS.
TOBACCO STRIPPING AND BOOKING MACHINE
No. 418,663. Patented Dec. 31, 1889.
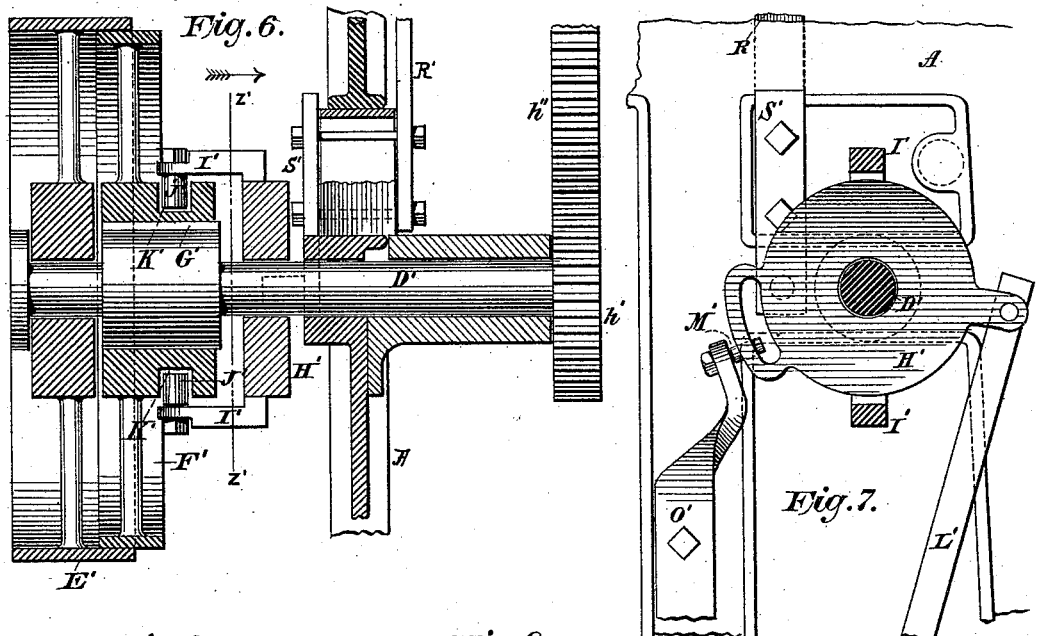
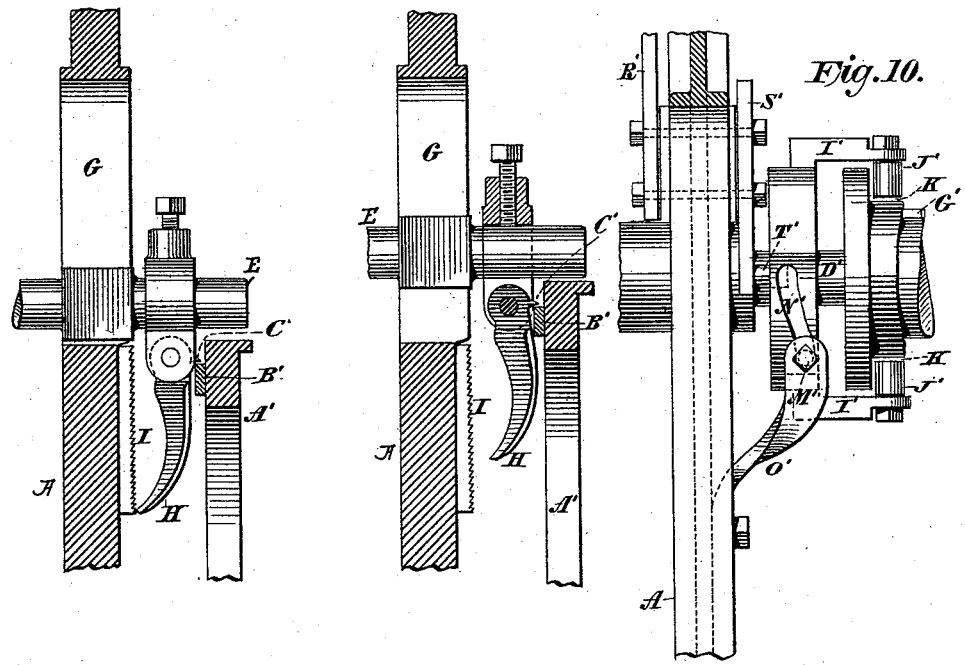
WITNESSES:
Gustave Dieterich
William Goebel
INVENTOR
John R. Williams
BY
Chas. C. Gill
ATTORNEY (No Model.)  
6 Sheets—Sheet 6.
J. R. WILLIAMS.
TOBACCO STRIPPING AND BOOKING MACHINE.
No. 418,663.  
Patented Dec. 31, 1889.
Fig. 11.
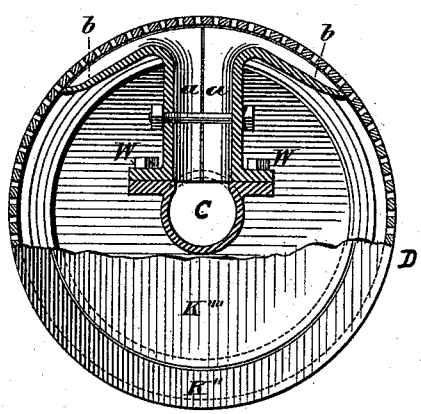
Fig. 12.
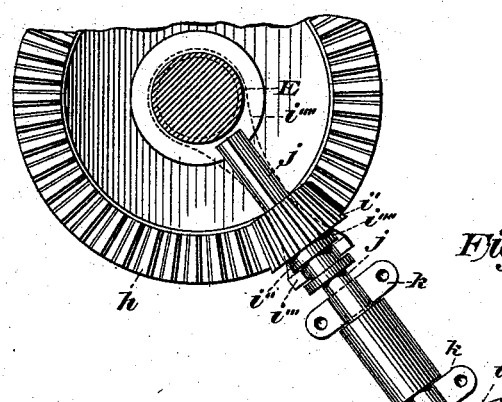
Fig. 13.
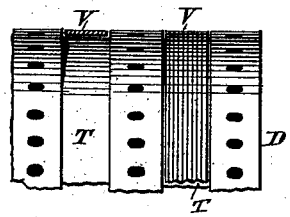
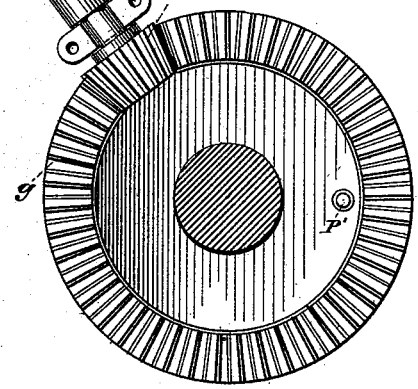
WITNESSES:  
Gustave Dieterich  
William Goebel
INVENTOR  
John R. Williams  
BY  
Chas. B. Gill  
ATTORNEY

UNITED STATES PATENT OFFICE.

JOHN R. WILLIAMS, OF NEWARK, NEW JERSEY, ASSIGNOR TO THE JOHN R. WILLIAMS COMPANY, OF NEW YORK, N. Y.

TOBACCO STRIPPING AND BOOKING MACHINE.

SPECIFICATION forming part of Letters Patent No. 418,663, dated December 31, 1889.

Application filed October 11, 1889. Serial No. 326,672. (No model.)

*To all whom it may concern:*

Be it known that I, JOHN R. WILLIAMS, a citizen of the United States, and a resident of Newark, in the county of Essex and State of New Jersey, have invented certain new and useful Improvements in Tobacco Stripping and Booking Machines, of which the following is a specification.

The invention relates to improvements in tobacco stripping and booking machines; and it consists in a machine employing stripping and booking cylinders, suction apparatus by which the leaf is held smoothly and evenly while being stripped of its stem, and a series of endless tapes, whereby the stripped leaves are carried to the booking-cylinder.

The invention consists, further, in novel features of construction and combinations of parts, hereinafter more fully described and claimed, reference being had to the accompanying drawings, in which—

Figure 1:
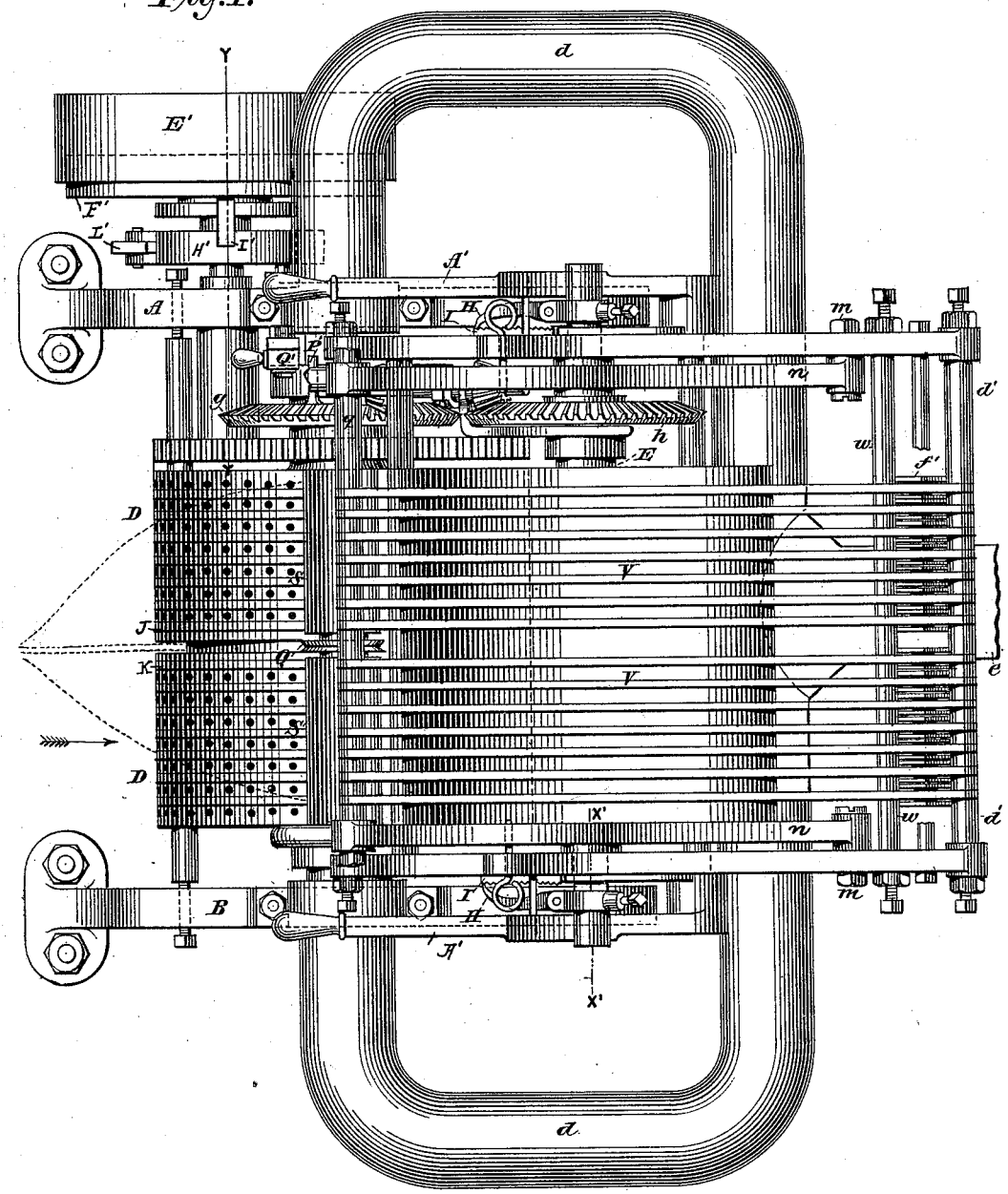
Figure 2:
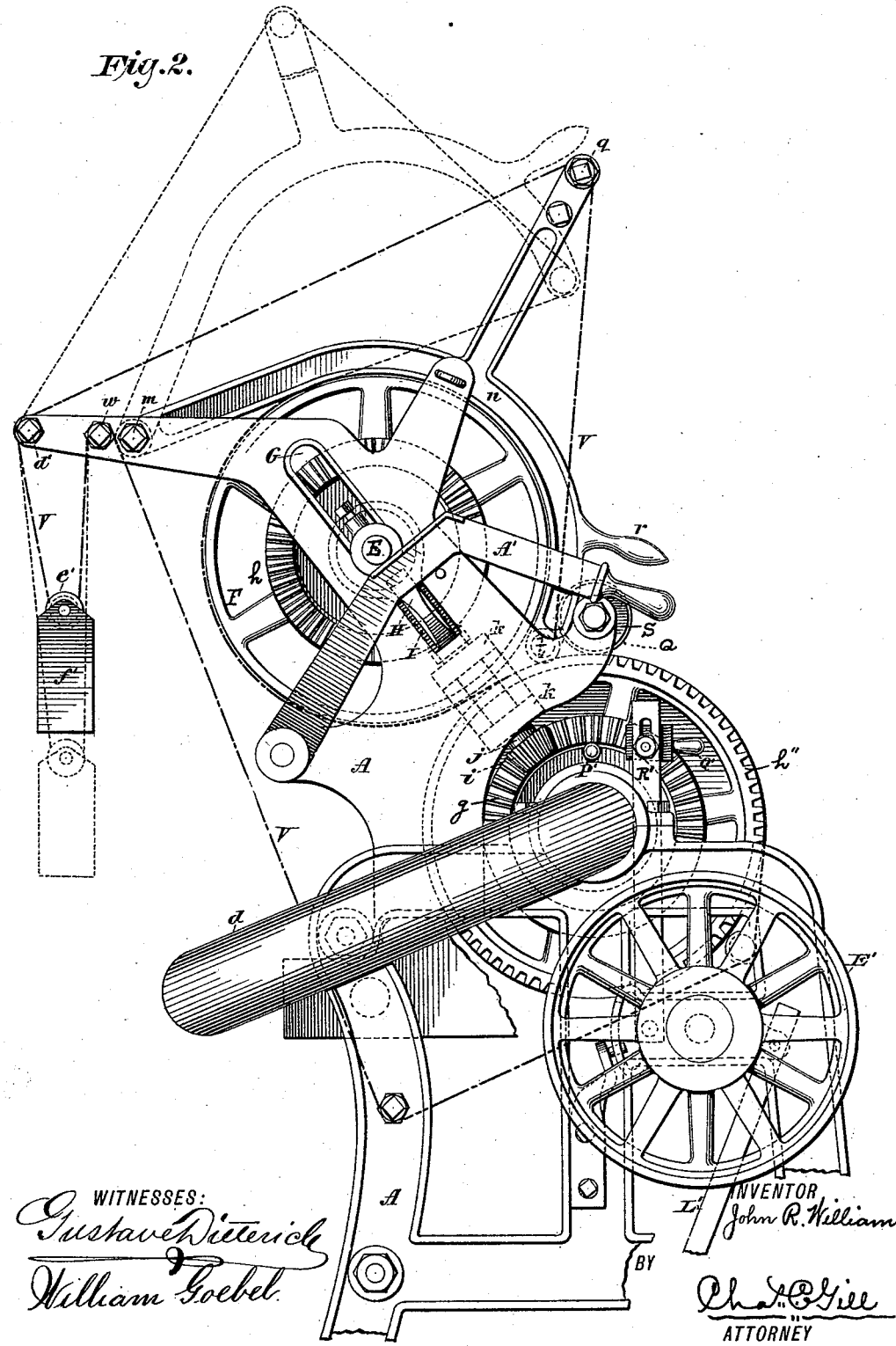
Figure 3:
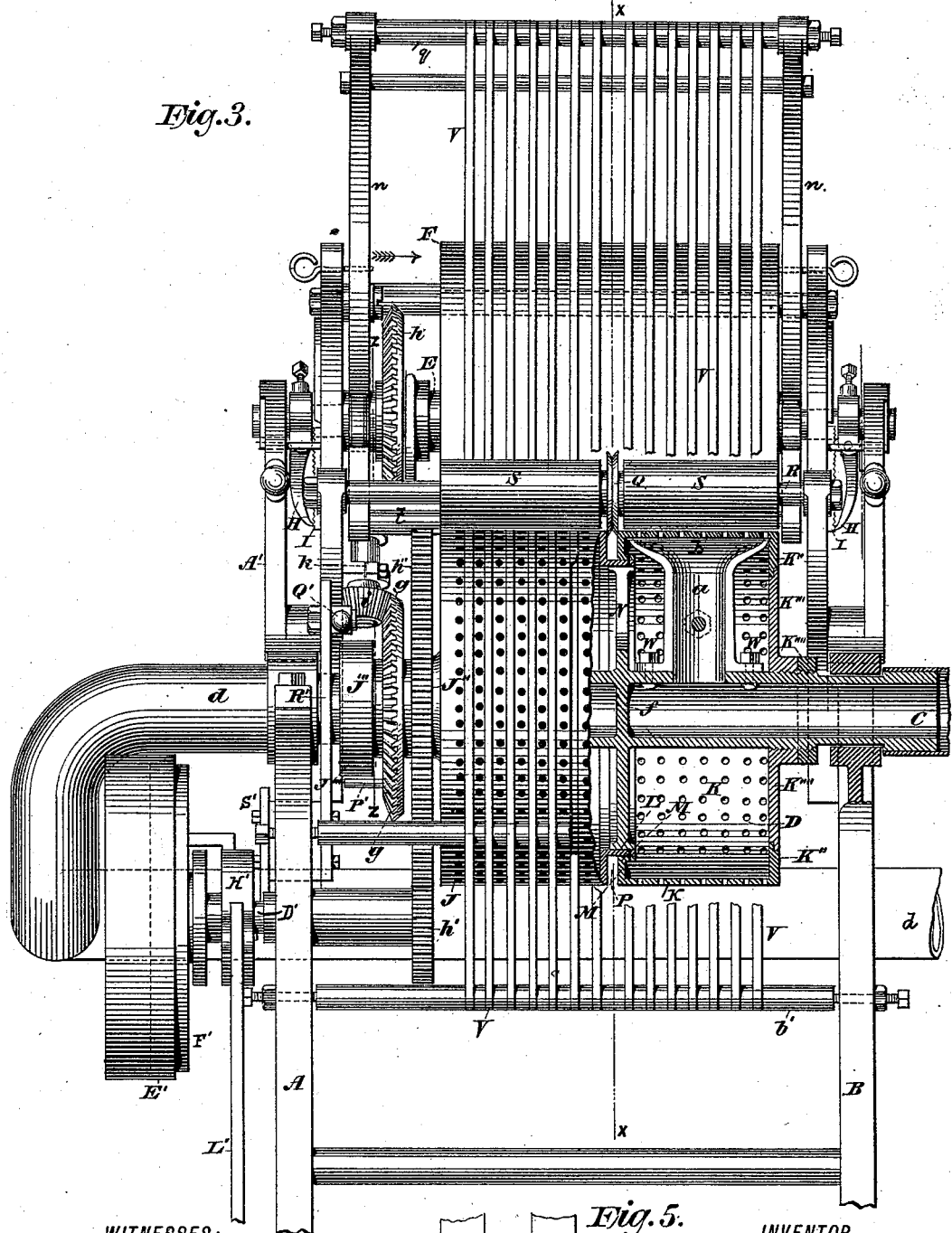
Figure 5:
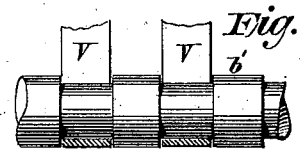

Figure 1 is a top view of a machine constructed in accordance with the invention, a tobacco-leaf being illustrated by dotted lines in the position in which it is fed to the machine for the purpose of having its stem stripped and its sides booked; Fig. 2, a side elevation of same, the upper section of the machine being illustrated in its elevated position by dotted lines, this position being given to said part of the machine when it is desired to remove the books from the booking-cylinder; Fig. 3, a front elevation of the machine, one portion of the stripping-cylinder being illustrated in section for the purpose of disclosing the interior construction by which the air-suction is directed against one portion of its surface; Fig. 4, a central vertical section of the machine on the dotted line X X of Fig.
3. Fig. 5 is a detached view of a portion of one of the grooved rods which support the endless tapes, the latter being in section; Fig. 6, a central vertical section of the clutch mechanism for starting and stopping the machine, the section being on the dotted line Y Y of Fig. 1; Fig. 7, a vertical section on the dotted line Z' Z' of Fig. 6, looking in the direction of the arrow, and illustrating the pitman-rod, which connects with the foot-treadle;
Figs. 8 and 9, detached vertical sections on the dotted line X X of Fig. 1, and illustrating the two positions of the lever and pawl by which the booking-cylinder may be lowered toward the stripping-cylinder after the former cylinder has been elevated by the accumulation of the stripped leaves; Fig. 10, a detached side elevation, partly in section, of a portion of the clutch mechanism for applying or cutting off power from the machine; Fig. 11, a vertical section through one of the stripping-cylinders; Fig. 12, a face view of the gearing by which power may be communicated from the stripping to the booking cylinder, said figure being partly in section on the dotted line Z Z of Fig. 3; and Fig. 13 is a detached view of a portion of one of the stripping-cylinders, shown on an enlarged scale, with annular grooves for receiving the endless tapes, one of the latter being illustrated in section.

In the drawings, A B designate the sides or frame of the machine supporting the transverse hollow axle C for the stripping-cylinder D, and the transverse shaft E, upon which is mounted the booking-cylinder F, the said shaft E having its ends set in inclined slots G, (see Fig. 2,) formed in the sides A B, and carrying the pawls H, (see Figs. 2, 8, and 9,) which automatically engage the racks I, secured to the frames A B in line with said slots G. The cylinder D revolves around the axle C, which is stationary, and the cylinder F revolves with the shaft E.

The stripping-cylinder D is formed in two parts or sections, lettered J K, respectively, and are perforated over their surface, as illustrated in Fig. 3, said sections J K being provided at their center with the flanges L M, which are secured together, and thus connect said parts J K to form a single stripping-cylinder D. The flanges L lightly impinge the annular flange N, cast with the hollow axle C, said flange serving to support the central portion of the cylinder D.

Between the sections or parts J K of the stripping-cylinder D is left the annular groove P, of sufficient width to receive the stem from the tobacco-leaf, the edges of the sections J K on opposite sides of said annular groove coacting with the revolving cutter Q to strip the stems from the leaf. The cutter Q (see Fig. 3) is secured upon the shaft R, whereon at opposite sides of said cutter Q are the feed-rollers S, which have a bearing upon the sections J K of the stripping-cylinder D.

I prefer to form the feed-rollers S of rubber or some like material, which may have a light tension upon the stripping-cylinder D during the operation of the machine without crushing the leaf under treatment.

The sections J K, constituting the stripping-cylinder D, are provided with annular grooves T (see Fig. 13) to receive the endless tapes V, hereinafter described, and the section J of said cylinder has a solid head at its outer end cast with the hollow hub J'', upon which the gear-wheel $h''$ and bevel gear-wheel $g$, hereinafter more particularly described, are mounted, as shown in Fig. 3, and which is closed at its outer end by the collar J'''.

The outer end of the section K of the stripping-cylinder D has an annular rim K'', which is flanged at its edge (see Fig. 3) to fit upon the correspondingly-formed edge of the circular frame K''', closing the outer end of the section K and affording a bearing upon which said end may rotate. The frame K''' has an internally-threaded hub engaging an external thread on the axle C, (see Fig. 3,) and is held in place with relation to the section K of the cylinder D by a nut K''''. Upon the hollow axle C of the stripping-cylinder is secured by bolts W the two castings $a$, (see Figs. 3, 4, and 11,) which are bolted together, as illustrated in Fig. 11, and form at their outer ends the flanges $b$, which at their outer edges come into light contact, or nearly so, with the interior surface of the stripping-cylinder D, so as to confine the action of the air to that portion of the cylinder within their outline, the other portions of the cylinder remaining unaffected, the full force of the air-suction being confined to that portion of the cylinder upon which the leaf is fed during the operation of the machine. The hollow axle C is in communication at its ends with the air-pipes $d$, one of the latter being at each side of the machine and branching from the main air-pipe $e$, (see Fig. 1,) which leads from a suction blower or other source, supplying air under pressure. The hollow shaft C contains a partition $f$ at a point between the two sections J K of the cylinder D, as shown in Fig. 1, in order to equalize the pressure of the air on said sections of the cylinder D.

The booking-cylinder F is hollow, for the sake of lightness, and receives its motion simultaneously with the stripping-cylinder D, through the medium of the beveled gear-wheels $g$ $h$ and pinion-wheels $i$ $i'$, as shown in Figs. 2 and 12, the gear-wheel $g$ being on the hub J'' and the gear-wheel $h$ being on the axle E of the booking-cylinder, while the pinion-wheels $i$ $i'$ are secured upon the inclined shaft $j$, which is mounted in blocks $k$, secured to the side A of the frame of the machine. The upper end of the inclined shaft $j$ is angular in cross-section, as shown in Fig. 12, and passes loosely through a correspondingly-formed aperture in the pinion-wheel $i'$, and said wheel has a grooved hub $i''$, which is engaged by the flange $i'''$ formed on the lower end of the plate $i''''$, hung upon the shaft E, the purpose of this arrangement being to cause the pinion-wheel $i'$ to be drawn upward upon the shaft $j$, or to be moved down the same during the elevation and depression of the booking-cylinder F, and hence to preserve the said pinion-wheel in engagement with the gear-wheel $h$ at all times under the varying conditions of the machine. The feed-rollers S receive their motion from their contact with the surface of the stripping-cylinder D.

To the upper portion of the sides A B of the frame of the machine is secured on pivots $m$ (see Figs. 1 and 2) the frame $n$, which has a hinged movement on said pivots, and is composed of two sides connected by the rod $q$, which is in an elevated position and provided with annular grooves to receive the endless tapes V, hereinafter more particularly described. The frame $n$ is adapted to have the hinged movement on its pivots $m$, (illustrated by dotted lines in Fig. 2,) and closely encompasses the upper front portion of the booking-cylinder F. The frame $n$ is provided with handles $r$, for the convenience of the operator in elevating said frame to its upper position when it is desired to remove the books from the cylinder F. The lower extremities of the sides $n$ are connected by the rod $t$, which is also provided with a series of annular grooves to receive the endless tapes V, which are illustrated by full lines in Fig. 1 and by dotted lines in Fig. 4, in which latter view it will be seen that they extend from, say, the grooved transverse rod $w$ downward to and under the grooved transverse rod $a'$, thence forward under the grooved transverse rod $b'$, and upward over the stripping-cylinder D, whence said tapes pass beneath the booking-cylinder F, extending around the same, and thence beneath the rod $t$, after which they pass upward over the rod $q$, then rearward to and along the outer side of the grooved transverse rod $d'$, and downward under the grooved rollers $e'$ of the tension-weights $f'$, after which they pass upward to the rod $w$, above referred to, thus forming a complete circuit and fitting grooves in said transverse rods and stripping-cylinder, whereby their relation to each other is preserved. The tension-weights $f'$ keep the tapes V taut and take up any slack that may occur either by the stretching of the tapes or other circumstances. A weight $f'$ is provided for each of the tapes V, and hence any slack occurring in one of the tapes will be immediately taken up without affecting the other tapes. The weights $f'$ preserve a uniform tension on the tapes V, and hence maintain an equal pressure over the cylinders D F. When the hinged frame $n$ is elevated, as illustrated in Fig. 2 by dotted lines, for the purpose of removing the books, (lettered $g'$ in Fig. 4,) the tension-weights $f'$ tighten the tapes from the transverse rod $t$ to the transverse rod $d'$, as illustrated by the dotted position of the weight in Fig. 2, and hence preserve the tapes in a taut condition at such times.

In the operation of the machine the stripping-cylinder D receives its motion from the driving-shaft through the pinion $h'$ and engaging gear-wheel $h''$, secured upon the hollow axle C, and the leaves of tobacco are fed upon the booking-cylinder D in the manner indicated by the dotted lines in Fig. 1. The end of the tobacco-leaf being introduced beneath the revolving cutter Q and the feed-rollers S, the leaf will be carried upward over the stripping-cylinder D, its stem being removed by the cutters, and its two sides will be carried upon the tapes V to the booking-cylinder F, where they will be formed into books $g'$. After the requisite number of leaves have been fed into the machine to form books of the desired size the frame $n$ will be elevated, as above described, and the books removed. After the removal of the books the frame $n$ will be lowered to its former position and the operation of the machine continued. In rear of the stripping-cylinder D is provided the discharge-chute $j'$, by which the stems are directed from the machine, and at the upper end of said chute $j'$ is the scraper $k'$, which lies close against the flange L in the groove P between the two sections of the stripping-cylinder D, for the purpose of insuring the removal of the stems from the stripping-cylinder.

During the use of the machine the clutch mechanism, hereinafter described, will be operated to stop the mechanism at the end of each complete revolution of the stripping and booking cylinders preparatory to another leaf of tobacco being fed to the machine for treatment. The flanges $b\ b$ of the castings $a$, being at the front and below the feed-rollers S S, they will outline convenient surfaces on the stripping-cylinder D at each side of the groove P to receive the leaf to be stripped, and hence the air-suction through the pipes $d$, hollow axle C, and castings $a$ will operate to hold the leaf smoothly upon the stripping-cylinder D during its passage beneath the feed-rollers S onto the tapes V, which convey its two sides to the booking-cylinder D, the stem of said leaf being removed by the cutters Q and discharged down the chute $j'$. The fact that the stripping and booking cylinders have a simultaneous motion and stop at a definite point at each revolution insures the convenient feeding of the leaf over the flanges $b$ in position to be acted on by the air-suction and the deposit of the stripped leaves at a definite place on the stripping-cylinder to form the books. The gradual formation of the book $g'$ and its passage between the cylinders F D during the operation of the machine has the effect of gradually elevating the booking-cylinder F in proportion to the increased thickness of said book, and at such time the said cylinder is sustained in its varying elevation by the engagement of the pawls H with the racks I, hereinbefore described. After the book has been formed and then removed from the booking-cylinder it will be necessary to again lower the latter to its former position, and this may be conveniently accomplished by elevating the hinged levers $A'$ to bring the lugs $B'$, carried by them, (see Figs. 2, 8, and 9,) against the projections $C'$ on the pawls H, thus freeing said pawls from the racks I and leaving the weight of the booking-cylinder on the said levers, which, upon being lowered, permit the descent of the cylinder. The weight of the stripping-cylinder is brought upon the levers $A'$ when the latter are elevated, owing to the fact that the ends of the shaft E of said cylinder extend outward beyond the side frames of the machine in position to be brought into contact with and rest upon said levers when the latter are elevated to free the pawls H from the racks I.

The driving-shaft $D'$ (see Figs. 1, 3, 6, and 10) carries upon its inner end the pinion-wheel $h'$, hereinbefore referred to, and upon its outer end is loosely mounted the belt-wheel $E'$, adjacent to which on said shaft is mounted the sliding clutch $F'$, a feather $G'$ being provided to insure the rotation of the clutch with the driving-shaft, and at the same time permit it to have a sliding movement toward and from the belt-wheel $E'$. When the clutch $F'$ is in contact with the belt-wheel $E'$, the motion of the latter will be communicated to the former and the driving-shaft $D'$, according to well-known principles. Between the clutch $F'$ and the side A of the machine there is loosely mounted on the driving-shaft $D'$ the disk $H'$, having arms $I'$, which carry rollers $J'$, engaging the groove $K'$ in the hub of the clutch $F'$, and said disk $H'$ is adapted to have a rotary and also a sliding movement on the driving-shaft $D'$, said rotary movement being imparted to said disk $H'$ from the usual foot-treadle (not shown) through the ordinary pitman-rod $L'$, which extends from the treadle to the disk, being pivoted at its upper end to the latter, as shown in Fig. 7. When the pitman-rod $L'$ is moved to rotate the disk $H'$ on the shaft $D'$, said disk has also a sliding motion imparted to it by the lug $M'$ and cam-groove $N'$, the latter being in the edge of the disk and the lug being held in the end of the bracket $O'$, (see Figs. 7 and 10,) and this sliding motion of the disk $H'$ operates, through the arms $I'$ and groove $K'$, to engage or disengage the clutch $F'$ from the belt-wheel $E'$; hence it will be observed that the operator by means of the foot-treadle may stop and start the movement of the mechanism at will.

In order to facilitate the stopping of the mechanism at the end of each revolution of the stripping and booking cylinders, or, in other words, at a definite point, without requiring the attention of the operator, so as to deposit the stripped leaves at a definite point on the cylinder F, the bevel gear-wheel $g$ is provided with the pin P', which at the end of such revolution or at such definite point comes into contact with the stop Q', pivoted to the standard R', and elevates said standard R', which, being connected with the disk H', serves to rotate the same and withdraw the clutch from the belt-wheel. The standard R' is on one side of the side A of the machine, and is connected with the standard S' on the other side of the said side A, as shown in Figs. 3 and 10, and the lower end of said standard S' carries a pin T', which enters an aperture in the disk H', thus establishing a connection of the stop Q' with the said disk. Upon the pin P' on the wheel $g$ striking the stop Q', the standards R' S' will be elevated, the clutch F' withdrawn from the belt-wheel E', and the rotation of the stripping and booking cylinders stopped. After another leaf is fed onto the stripping-cylinder D the operator, by means of the foot-treadle and pitman-rod L', again sets the mechanism in motion, this stopping and starting taking place at each revolution of the cylinders.

The stopping and starting of the mechanism could be effected by the foot-treadle and connections alone; but the stop Q' for stopping the motion at a definite point relieves the operator from the necessity of attending to the stopping of the machine.

Where the cylinders are stopped at the end of each revolution, but one book $g'$ will be formed on the cylinder F; but should it be desired to form two books on said cylinder the latter and the cylinder D should be stopped at the end of each half-revolution thereof. The stopping of the cylinders at any definite point or points may be regulated by the position and number of the pins P' on the wheel $g$.

In Fig. 4 is shown certain recording mechanism, consisting of the pawls V' W', ratchet V'', and bell W''; but this forms no part of the invention sought to be claimed herein, and any usual mechanism for recording the number of leaves stripped on the machine may be made use of, if it should be desired to record this fact by mechanical means.

What I claim as my invention, and desire to secure by Letters Patent, is—

1. In a stripping and booking machine, the perforated stripping-cylinder, the booking-cylinder and cutters for removing the stem from the leaf, combined with an air-exhaust for holding the leaf upon the stripping-cylinder and the series of tapes passing over the said cylinders and supported upon rods, substantially as and for the purposes described.

2. In a stripping and booking machine, the perforated stripping-cylinder, an air-exhaust connected with said cylinder, the booking-cylinder and the cutters, combined with the tapes passing over said cylinders, gearing for imparting a simultaneous motion to said cylinders, and mechanism, substantially as described, for stopping the rotation of said cylinders at a definite point, substantially as set forth.

3. In a stripping and booking machine, the perforated stripping-cylinder having the groove to receive the stem of the leaf, an air-exhaust connected with said cylinder, the cutters for removing the stem, and the booking-cylinder, combined with the hinged frame carrying cross-rods traversing the booking-cylinder and the series of tapes passing over said cylinders and rods, substantially as and for the purposes set forth.

4. In a stripping and booking machine, the perforated stripping-cylinder having the groove to receive the stem of the leaf, an air-exhaust connected with said cylinder, the cutters for removing the stem, and the booking-cylinder, combined with the hinged frame carrying cross-rods traversing the booking-cylinder and the series of endless tapes passing over said cylinders and said rods and looped on additional cross-rods to support the series of tension-weights, substantially as set forth.

5. In a stripping and booking machine, the perforated stripping-cylinder, the hollow axle therein, the castings $a$, having flaring flanges $b$, communicating with said axle, for exhausting the air within a definite outline, the cutters for removing the stem of the leaf, and the feed-rollers, combined with the booking-cylinder, tapes passing from the stripping-cylinder to said booking-cylinder, and mechanism, substantially as described, for rotating said cylinders, substantially as and for the purposes set forth.

6. In a stripping and booking machine, the perforated stripping-cylinder having the annular groove to receive the stem of the leaf, an air-exhaust connected with said cylinder, means for confining the action of the air to that portion of said cylinder on which the leaf is to be fed, the cutters for removing the stem, and the feed-rollers, combined with the booking-cylinder, tapes passing from the stripping to the booking cylinder, and mechanism, substantially as described, for rotating said cylinders, substantially as set forth.

7. In a stripping and booking machine, the perforated stripping-cylinder having the annular groove to receive the stem, air-exhaust mechanism, substantially as described, for holding the leaf upon said cylinder, the feed-rollers, and cutters, combined with the booking-cylinder, the series of tapes passing from one cylinder to the other, gearing for rotating said cylinder, mechanism, substantially as described, for automatically stopping the cylinders at a definite point, and mechanism, substantially as described, for permitting the booking-cylinder to be elevated or depressed, substantially as set forth.

8. In a stripping and booking machine, the perforated stripping-cylinder, an air-exhaust connected with said cylinder, the feed-rollers, the cutters for removing the stem from the leaf, and the booking-cylinder, combined with the hinged frame $n$, having rods $q\ t$, the endless tapes passing over said cylinders and rods, and the tension-weights suspended on said tapes, substantially as and for the purposes set forth.

9. In a stripping and booking machine, the stripping and booking cylinders, the cutters for removing the stem from the leaf, and the feed-rollers, combined with the hinged frame $n$, having rods $q\ t$, the rods $a'$, $b'$, $d'$, and $w$, the series of endless tapes V, passing over said cylinders and said rods, and the tension-weights $f'$, suspended on said tapes, substantially as set forth.

10. In a stripping and booking machine, the perforated stripping-cylinder formed in two sections, an air-exhaust connected with each of said sections, the cutters for removing the leaf, and the booking-cylinder, combined with the tapes passing from one cylinder to the other, gearing for rotating said cylinders, and mechanism, substantially as described, for stopping and starting the cylinders, substantially as set forth.

Signed at New York, in the county of New York and State of New York, this 9th day of October, A. D. 1889.

JOHN R. WILLIAMS.

Witnesses:
CHAS. C. GILL,
R. A. PORTEOUS.